UNITED STATES PATENT OFFICE.

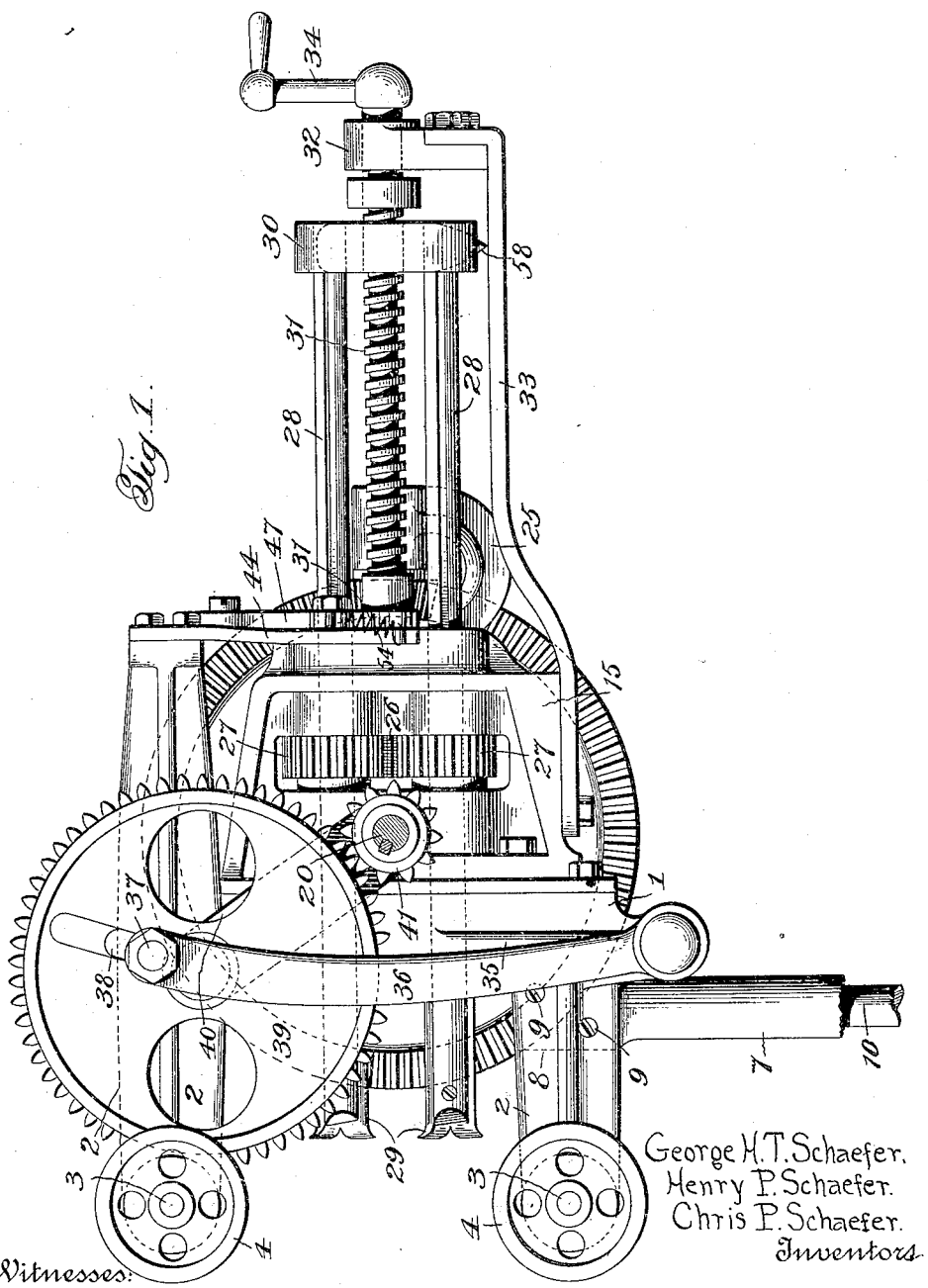

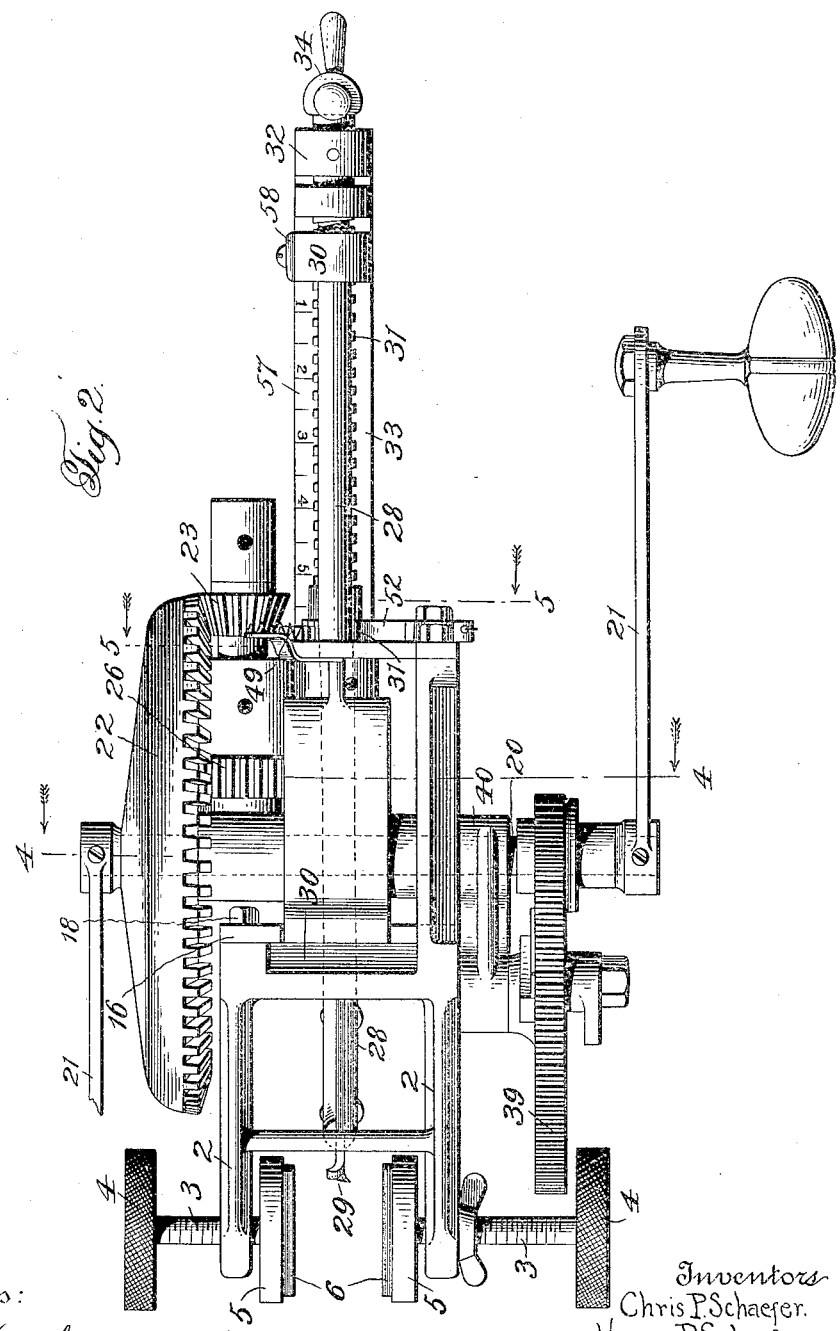

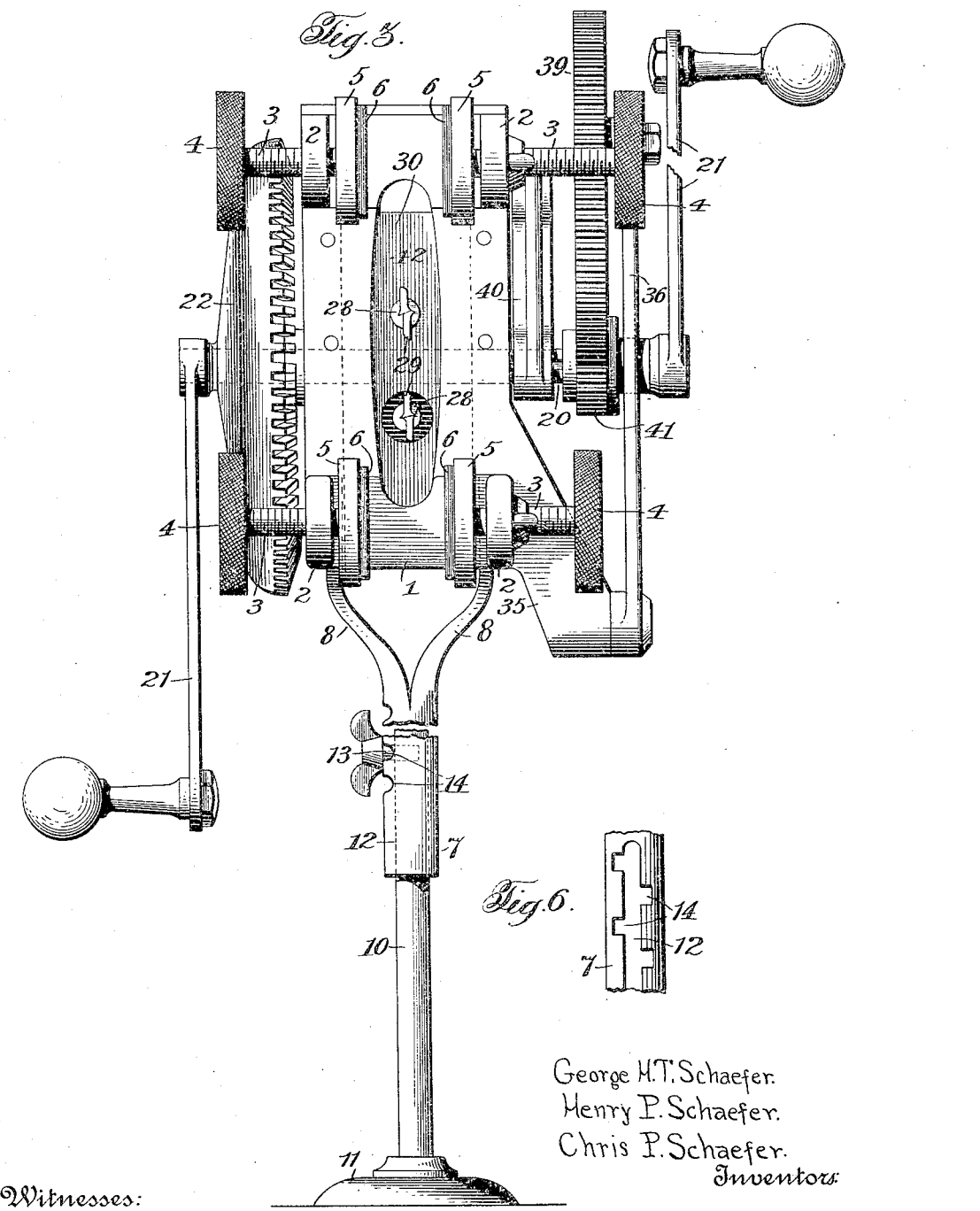

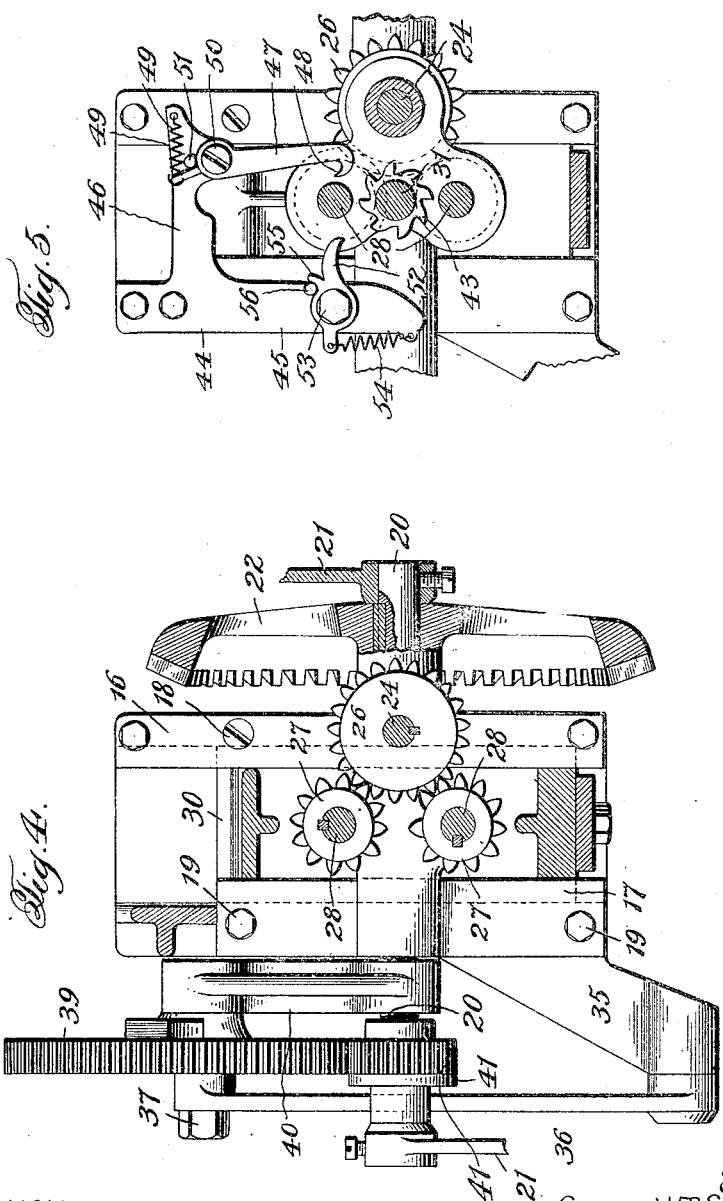

GEORGE H. T. SCHAEFER, OF ATCHISON, AND CHRIS P. SCHAEFER AND HENRY P. SCHAEFER, OF TOPEKA, KANSAS.

MORTISING-MACHINE.

1,126,093.     Specification of Letters Patent.      Patented Jan. 26, 1915.

Application filed May 14, 1913. Serial No. 767,745.

*To all whom it may concern:*

Be it known that we, GEORGE H. T. SCHAEFER, residing at Atchison, county of Atchison, State of Kansas, and CHRIS P. SCHAEFER and HENRY P. SCHAEFER, residing at Topeka, county of Shawnee, State of Kansas, citizens of the United States, have invented certain new and useful Improvements in Mortising-Machines, of which the following is a specification.

This invention relates to improvements in woodworking machines, and is more particularly related to mortising machines.

The object of the present invention is to provide an improved type of mortising machine, especially designed for use upon doors to prepare the same for the reception of mortise locks, the construction of the machine being such as to render the operation of cutting the mortise more expeditious than heretofore, thus economizing in the time required and permitting a greater amount of work to be performed in a given period.

Subordinate to the foregoing, the invention also has in view the provision of a mortising machine constructed with especial reference to its portability, and including in its organization simple and durable means for efficiently supporting the machine in relation to the work to be acted on by the machine.

Other objects are also in view, in addition to those recited, which will appear as the nature of the improvements is better understood, the invention consisting substantially in the novel construction, combination and arrangement of parts hereinafter fully described, illustrated in the accompanying drawings, and pointed out in the appended claim.

In the drawings—Figure 1 is a side elevation of a mortising machine constructed in accordance with the present invention. Fig. 2 is a top plan view thereof. Fig. 3 is an end elevation of the machine viewing the same at the end whereat are located the clamping means for holding the machine in operative relation to the work. Fig. 4 is a transverse sectional view on the line 4—4, Fig. 2. Fig. 5 is a similar view on the line 5—5, Fig. 2. Fig. 6 is a fragmentary elevation of the supporting member for the machine, illustrating the construction and arrangement of the notches in the sides of the slotted head thereof.

Referring in detail to the accompanying drawings, the numeral 1 designates the main frame of the hereindescribed machine. This is substantially rectangular in its vertical dimensions, and projecting from the upper and lower edges of the frame 1 are horizontally-disposed parallel wing frames 2. In each side of the free end of each of the wing frames 2 is mounted a screw-threaded clamp 3 the outer end of which is provided with a hand wheel 4 by which the clamp may be operated, the inner end having a flanged disk 5 in which is seated a leather button 6, or its equivalent, adapted to contact with the door or other work in which the mortise is to be formed. Through the medium of the clamps 3 the machine is held in fixed relation to the door or other work, and in order that the weight of the machine, when applied to the work, shall not be sustained wholly thereby, a supporting member 7 is associated with the machine. This member comprises a bifurcated head 8 the sides of which are designed to fit within the lower wing frame 2, screws 9 or their equivalent being employed for fastening the sides of the head 8 to the sides of said wing frame, and telescopically arranged in the bifurcated head 8 is a leg 10 having at its lower end a base 11. One side of the head 8 is provided with a longitudinal slot 12 which receives a screw 13 that is threaded into the leg 10, and each side of the slot 12 has a plurality of notches 14 any one of which is designed to receive the screw 13. Through the medium of the screw 13 and said notches 14 the supporting member 7 may be lengthened or shortened, and when the desired length has been determined a relative rotation of the leg 10 within the head 8 will position the shank of the screw 13 in the opposite notch 14, whereupon the parts 10 and 11 may be locked together by tightening the screw 13. It will thus be seen that while the supporting member 7 will relieve the clamps 3 of the strain incident to the application of the machine to the work, this supporting member will also hold the machine in elevated position when the machine has been removed from the work.

In the construction of the present machine a characteristic feature of its organization is the mounting of the mortising cutters in such manner that not only may rotary movement be imparted thereto for effecting a boring action of the cutters, but they are also caused to travel in a lineal path at right angles to the line of boring, thus simultaneously extending the boring action of the cutters to the extent which it is desired to elongate the mortise. To the accomplishment of this end the main frame 1, by reason of its clamped position upon the work, remains in a fixed or stationary position, while the mounting for the mortising cutters is caused to move in relation to said main frame 1. This mounting comprises essentially a supplemental frame 15, which frame is in the nature of a crosshead, the same being mounted for reciprocatory vertical sliding movement on the main frame 1 through the medium of guides 16 and 17, which guides are arranged at opposite sides of said supplemental frame, the guides being bolted to the main frame, as at 18 and 19. Extending transversely of the supplemental frame 15 is a main shaft 20 upon the ends of which are detachably connected operating cranks 21. Carried by the shaft 20 is a bevel gear wheel 22 the teeth of which mesh with a bevel pinion 23, said bevel pinion 23 being mounted on an intermediate shaft 24 which extends at right angles to the shaft 20, the intermediate shaft 24 being journaled in a curved yoke 25 which extends rearwardly from the supplemental frame 15. Also carried by the shaft 24 is a spur pinion 26 the diameter of this pinion being such, as illustrated clearly in Fig. 4, to engage simultaneously with similar pinions 27. The pinions 27 are carried by two parallel cutter shafts 28, being splined to said shafts, so that while they impart rotary movement to the shafts 28, the shafts may be fed in a longitudinal direction through the pinions in the manner hereinafter described. It will therefore be seen that with motion imparted to the shaft 24 through the gear 22 and pinion 23, driving action is imparted to the pinions 27 and the shafts 28 from the spur pinion 26. This causes the shafts 28 to rotate in the same direction, and mounted at the forward ends of said shafts are mortising cutters 29 which may be of any approved construction. The rear ends of the shafts 28 are rotatably mounted in a crosshead 30, which crosshead engages a feeding screw 31 the rear end of which is supported by the vertically-extending end 32 of a supporting arm 33 which is suitably connected to the supplemental frame 15. The feeding screw 31 has an operating crank 34 by which it may be manually rotated, and thereby cause the crosshead 30 to travel along said screw. Obviously, as the crosshead 30 moves along the screw 31, the cutters 29 are caused to advance or recede in accordance with the direction of movement of the crosshead 30, and by the manual operation of the screw 31 a rapid adjustment of the cutters 29 with respect to the work is effected. These cutters are automatically fed toward the work during the operation of the machine, as well as manually, the construction by which this is accomplished being described at a later point herein.

As before indicated, the mortising cutters 29 are also caused to travel in a lineal path at right angles to the line of boring, the purpose of this being to cut the length of the mortise, and to the accomplishment of this end the main frame 1 is provided with a downwardly-extending arm 35, said arm forming a point of attachment for a link 36, the lower end of said link being connected to the arm 35 so as to swing thereon. The upper end of the link 36 carries a wrist pin 37, in the form of a bolt, said wrist pin being mounted in a radial slot 38 which is formed in a floating gear wheel 39. The gear wheel 39 is suitably journaled upon a supporting arm 40 mounted upon the main shaft 20, and said gear is therefore supported by the supplemental frame 15 in which said main shaft 20 is journaled. The teeth of the gear 39 mesh with the teeth of a pinion 41 which is also carried by the main shaft 20, so that the gear 39 is driven directly by said main shaft. The wrist pin 37 is adjustable in the radial slot 38 of the gear 39, and when adjusted to the desired position in said slot it will be obvious that, in the rotation of the gear 39, the supplemental frame 15 is caused to rise and fall the degree of movement of the supplemental frame being determined by the degree of adjustment of the wrist pin 37 in the slot 38 in relation to the point of attachment of the link 36 to the attaching arm 35. Hence, the vertical movement of the mortising cutters 29 may be greater or less in accordance with the point to which the wrist pin 37 is adjusted in said slot 38.

The main frame 1 has formed therein an elongated slot 42 through which the mortising cutters 29 project, and this slot 42 is of sufficient length to allow the full limit of vertical movement of the cutters 29 through said slot.

To provide for the automatic feed of the cutters 29 during the operation of the machine, so that they may be periodically advanced into the work, a ratchet wheel 43 is mounted upon the feeding screw 31, and is positioned thereon at a point contiguous to the rear end of the main frame 1. Depending from the top of such end is a supporting bracket 44 having a vertical arm 45 and a horizontal arm 46, the latter projecting over the cutter shafts 28. This horizontal arm 46 carries an elongated pawl 47 having an upwardly-extending nose 48 which is adapted to take under the under side of the teeth of the ratchet wheel 43 on the downward movement of the ratchet wheel 43 induced by the downward movement of the supplemental frame 15. Hence, as the pawl 47 is carried by the fixed stationary main frame 1, it will be evident that when the engagement referred to takes place the wheel 43 is rotated to a limited extent, say, for the distance of one tooth thereof, the nose 48 being normally adapted to engage the teeth of the ratchet wheel 43 by means of a spring 49 which is connected to the upper end of the pawl 47. The latter is pivotally mounted upon the arm 46 by a screw 50, and said upper end of the pawl 47 is adapted to contact with a stop lug 51 under the stress of the spring 49. On the upward movement of the ratchet wheel 43 the teeth thereof will ride over the nose 48 of the pawl 47, the spring 49 yielding under such conditions, and as soon as the wheel 43 has passed the nose 48 the spring 49 presents said nose for engagement with the ratchet wheel 43 when it again descends.

The vertical arm 45 of the bracket 44 also carries a pawl 52, said pawl being pivotally connected to the arm 45 by a screw 53. The nose of the pawl 52 projects into the path of movement of the teeth of the ratchet wheel 43, but it is designed to engage these teeth at the side of said wheel which is opposite to the point of engagement of the pawl 47. The pawl 52 is normally held in such position by a spring 54, and to limit the movement of said pawl under the stress of the spring 54 a stud 55 is carried by the pawl 52 designed to engage a stop lug 56 carried by the arm 45. The stop lug 56 also opposes any pressure on the nose of the pawl 52, so that on the rise of the ratchet wheel 43 the nose of the pawl 52 engages one tooth of said wheel, and thus turns the latter to a limited extent, say, for the distance of one tooth. As indicated, this occurs during the rising movement of the ratchet wheel 43, while on the descent of the latter the pawl 47 becomes effective to turn said ratchet wheel 43, the pawls 47 and 53 operating alternatively to rotate said wheel, and thus to impart rotation to the feeding screw 31. It will therefore be evident that the crosshead 30 is advanced a limited degree at each upward and downward movement of the supplemental frame 15, with a resultant advancing of the mortising cutters 29. This action is purely automatic, and continues until the required depth has been imparted to the mortise. After the mortise has been cut to the required depth the cutters 29 may be withdrawn by reversing the rotation of the screw 31 through its manual operation by the crank 34.

For the purpose of determining the depth of the mortise the upper surface of the supporting arm 33 is provided with a graduated scale 57, clearly shown in Fig. 2, which scale may be properly designated by inches, and divided into fractions thereof, and coöperating with said scale is a pointer 58 carried by one side of the crosshead 30. The depth of cut thus will be indicated by the extent of movement of the pointer 58 in relation to the graduated surface of the scale 57.

In the operation of the hereindescribed machine, it being assumed that it is desired to mortise the edge of a door for the application of a mortise lock thereto, the door is placed between the disks 5 of the clamps 3, and said clamps are screwed tightly upon the sides of the door. By proper adjustment of the respective clamps the machine will also be positioned for the mortising cutters 29 to cut at the proper point in the edge of the door. A proper adjustment of the supporting member 7 is also effected in order that the machine may be supported at the right height above the surface on which it is placed. If the points of the cutters 29 are remote from the edge of the door, manual operation of the feeding screw 31 will rapidly advance the cutters to a point in proximity to the door. Power being applied to the cranks 21, the main shaft 20 commences its rotation, and through the medium of the gear 22 and the pinion 23 motion is imparted to the intermediate shaft 24, which, in turn, operates the pinions 26 and 27. Rotary movement is thus imparted to the cutter shafts 28, and at the same time motion is communicated from the main shaft 20 through the pinion 41 to the gear wheel 39. The lower end of the link 36 having a swinging movement on the fixed arm 35, the rotation of the wheel 39, as previously explained, causes a vertical reciprocatory movement to be imparted to the supplemental frame 15, during which movement the ratchet wheel 43 is periodically moved, giving to the feeding screw 31 an impulse upon engagement of each of the pawls 47 and 52 with said ratchet wheel. The cutters 29 thereby not only effect a boring action on the door, but their movement in a lineal path also cuts the mortise to the length determined by the movement of the supplemental frame 15 under the influence of the link 36. When the depth of the mortise has been reached, as indicated at the scale 57, rotation of the main shaft 20 is stopped, and the cutters 29 withdrawn from the mortise by manual operation of the crank 34 to reverse the direction of movement of the feeding screw 31.

While the machine has been described primarily in connection with the mortising of doors for the application thereto of mortise locks, it is obvious that its utility is not restricted to this field, but it is capable of employment with any work where mortising is desired.

By reference to Fig. 6, it will be noted that the notches 14 in the sides of the slot 12 are not opposite each other, but they are arranged in staggered relation, the notches at one side being opposite the spaces between the notches at the other side. This provides, therefore, for a much finer adjustment in the lengthening or shortening of the supporting member 7 than if the notches in each side were opposite the notches in the other side.

Having thus described the invention, what is claimed as new, and desired to be secured by Letters Patent, is:

A machine of the class described comprising in combination, a main frame, an adjustable support for the frame, a supplemental frame slidable and guided in the main frame, means for clamping the main frame to the work to be acted upon, cutter members in the supplemental frame, a main shaft in the supplemental frame, a gear on the main shaft, a gear meshing with said gear and connected with said cutter members, another gear on the main shaft, a loose gear meshing with the last mentioned gear, a pin supporting the loose gear, a link connecting the pin and shaft together whereby the said gears will be kept in contact with one another, a link secured to the main frame and adjustably secured to the loose gear whereby the rotation of the latter will cause non-curvilinear reciprocation of the supplemental frame, and a plurality of handles for rotating the main shaft.

GEORGE H. T. SCHAEFER.

Witnesses:
WALTER E. BROWN,
NETTIE RAY CLUTE.

CHRIS P. SCHAEFER.
HENRY P. SCHAEFER.

Witnesses:
WILL R. JOHNSMEYER,
W. L. FULTON.